United States Patent
Leitmayr et al.

(10) Patent No.: US 7,744,676 B2
(45) Date of Patent: Jun. 29, 2010

(54) TSA PROCESS

(75) Inventors: Werner Leitmayr, Neuburg/Donau (DE); Ralf Müller, Eschenlohe (DE)

(73) Assignee: Linde Aktiengesellschaft, Munich (DE)

(*) Notice: Subject to any disclaimer, the term of this patent is extended or adjusted under 35 U.S.C. 154(b) by 659 days.

(21) Appl. No.: 11/683,588

(22) Filed: Mar. 8, 2007

(65) Prior Publication Data
US 2007/0240568 A1    Oct. 18, 2007

(30) Foreign Application Priority Data
Mar. 9, 2006    (DE) .............. 10 2006 011 031

(51) Int. Cl.
*B01D 53/02*    (2006.01)

(52) U.S. Cl. .................. 95/99; 95/106; 95/114; 95/148

(58) Field of Classification Search .......... 95/99, 95/106, 114, 148
See application file for complete search history.

(56) References Cited

U.S. PATENT DOCUMENTS

2007/0000383 A1* 1/2007 Ackley .............. 95/90

* cited by examiner

*Primary Examiner*—Robert A Hopkins
(74) *Attorney, Agent, or Firm*—Millen, White, Zelano, Branigan, P.C.

(57) ABSTRACT

In a TSA process of an at least two-component raw gas, to adjust for fluctuation in load, the cycle time of at least one method step is extended in the event of falling below the design load value.

20 Claims, 1 Drawing Sheet

Figure
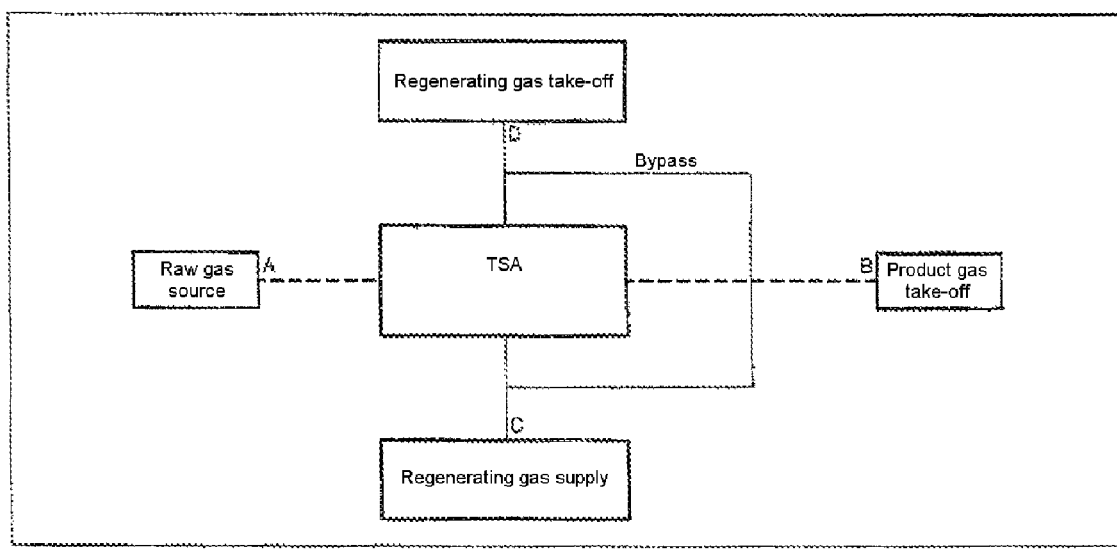

TSA PROCESS

The invention relates to a method for separating an at least two-component raw gas by means of a Temperature Swing Adsorption (TSA) process, which comprises at least the method steps of adsorption and regeneration, the cycle times of the individual method steps being configured for a design load value of the raw gas.

Adsorption processes or methods, in which the laden adsorbent is regenerated by increasing the temperature—optionally together with further measures which support regeneration of the laden adsorbent—are referred to as T(emperature)S(wing)A(dsorption) methods. In a TSA method, at least two adsorbent beds are exposed to a feed gas mixture of two or more components whereby one or more of the components of the feed gas mixture is preferably adsorbed by the adsorbent. The flow of feed gas to one of the adsorbers is then interrupted and a regeneration gas is introduced to the adsorbent bed to recover the adsorbed component(s). During the regeneration step, the adsorbent bed is exposed to a higher temperature then during the adsorption step to enhance recovery during regeneration. The steps of adsorption and regeneration are repeated in cycles.

Such a TSA method is known, for example, from the German Patent Application 10 2005 032 025 (not yet published at the priority date of the present application), the entire disclosure of which is hereby incorporated by reference.

Previously, the cycle times of the individual method steps—for example when implementing or establishing the control program of a TSA process—have been configured for a particular or intended design load value of the raw gas (i.e., the feed flow rate under design conditions like the pressure and temperature of the design feed gas composition). Load value refers to the amount of component(s) to be adsorbed. The cycle times thereby established for the individual method steps are then—if necessary—adapted to the actual situation exclusively by means of manual modifications of the control program.

In many TSA processes—particularly in TSA processes which are integrated into multistage processes, such as for example cryogenic CO or $C_2H_4$ production—unavoidable changes or fluctuations are often encountered in the design load value of the raw gas supplied to the TSA process.

SUMMARY OF INVENTION

An aspect of the invention is to provide a method of for separating an at least two-component raw gas by means of a TSA process, which makes it possible to compensate for these changes or fluctuations in the design load value of the raw gas.

Upon further study of the specification and appended claims, further objects, aspects and advantages of this invention will become apparent to those skilled in the art.

In accordance with the invention, it is proposed that the cycle time of at least one method step should be extended in the event of falling below the design load value.

BRIEF DESCRIPTION OF THE DRAWINGS

Various other features and attendant advantages of the present invention will be more fully appreciated as the same becomes better understood when considered in conjunction with the accompanying drawing wherein:

FIG. 1 is a flow chart for a TSA process, previously presented in German patent application 10 2005 032 025.

DETAILED DESCRIPTION

To explain the methodology according to the invention, reference will be made to the FIGURE—which has already been presented in German patent application 10 2005 032 025 cited above.

In a schematized form, this shows a TSA method, or the incorporation of a TSA method into an arbitrary process, as has been explained above.

The term "raw gas source" is intended to mean any source of the raw gas to be supplied to the TSA process. The term "product gas take-off" is also intended to cover any further method steps in which the product gas obtained by the TSA process is subjected to an arbitrary further treatment.

The term "regenerating gas supply" used in the FIGURE is intended to mean any source of the regenerating gas. In this context, some of the product and/or raw gas may be used as a regenerating gas; it may nevertheless also come from an independent ("external") gas source.

The term "regenerating gas take-off" is intended to cover any recipients of the gas used for regenerating the adsorber or adsorbers of the TSA process. This may, for example, be a flare, a burner, or other apparatus.

By means of the methodology according to the invention, even in the event of a load deficit it is now possible to minimize the fluctuations in the method flows at the points B and D—i.e., the fluctuations of the product gas and of the regenerating gas extracted from the TSA process—as well as the temperature fluctuation of the product gas at the point B since, by extending the length of the cycle times, it also becomes possible to reduce the temperatures and/or mass flows of the individual method steps while, for example, nevertheless keeping unchanged the integral thermal input for heating.

Further advantageous configurations of the method according to the invention include:

- cycle times of all method steps are extended in the event of falling below the design load value.
- the extension of the cycle time of at least one method step is carried out proportionally to the shortfall of the design load.
- the cycle time of at least one method step is established according to the following formula:

$$Cycletime\_cu = Cycletime\_sp * F\_Load * F\_PT * F\_OP * F\_Age$$

where

Cycletime_cu denotes the cycle time to be established,

Cycletime_sp denotes the cycle time configured for the design load,

F_Load denotes the load (where Load=predetermined raw gas flow rate/current determined raw gas flow rate), F_PT denotes the raw gas conditions, F_OP denotes the specification by the operating staff and F_Age denotes the ageing status of the adsorbent.

The term "raw gas conditions" used above is intended particularly to mean the parameters of pressure and temperature.

F_PT, F_OP, and F_Age are each independently values close to 1, typically within 0.5 to 1.5. F_PT is a function value that depends on the actual operating conditions/parameters like pressure and temperature.

In the formula given above, the operating staff may modify all or some of the cycle times within certain limits by proportionally entering a number for F_OP. If no modification is to be made, F_OP is equal to 1.

If—according to another advantageous configuration of the method according to the invention—at least one component occurring at a concentration of less than 2 vol. % (trace component) is removed from the at least two-component gas by the adsorbent bed, then the cycle time of at least one method step is established according to the following formula:

$$Cycletime\_cu = Cycletime\_sp * F\_Load * F\_PT * F\_OP * F\_Age F\_Tr$$

where

Cycletime_cu denotes the cycle time to be established,

Cycletime_sp denotes the cycle time configured for the design load,

F_Load denotes the load (where Load=predetermined raw gas flow rate/current determined raw gas flow rate), F_PT denotes the raw gas conditions, F_OP denotes the specification by the operating staff and F_Age denotes the ageing status of the adsorbent F_Tr denotes the content of trace components.

The content of trace components is determined by an analysis of the raw gas and/or based on knowledge of the vapour pressure curve with saturated trace components. A value for F_Tr which is greater than 1 means a lower content of trace component(s) in the feed gas than in the design gas. A value for F_Tr which is less than 1 means a higher content of trace component(s) in the feed gas than in the design gas.

As a further optimization of the method according to the invention, it is also possible to carry out continuous monitoring of the absolute quantity of the trace component(s) which have entered the adsorber. This quantity may be determined computationally from the content of this component(s) in the raw gas, the raw gas stream and the adsorption time.

In a refinement of the method according to the invention, it is furthermore proposed that the calculation of the cycle time should be carried out adaptively, the cycle time being replaced by a counter state (Counterstate_sp=Cycletime_sp), and the current counter state being established according to the following formula:

$$Counterstate\_cu = \sum_{i=0}^{N} F\_Load_i * F\_PT_i * F\_OP_i * F\_Age_i * F\_Tr_i * \Delta t_{i-1}$$

where

Counterstate_cu denotes the current counter state to be established,

Counterstate_sp denotes the counter state configured for the design load and relates to the load value, F_Load denotes the load (where Load=predetermined raw gas flow rate/current determined raw gas flow rate), F_PT denotes the raw gas conditions, F_OP denotes the specification by the operating staff and F_Age denotes the ageing status of the adsorbent F_Tr denotes the content of trace components and $\Delta t_{i-1}$ denotes the time difference between the last and current calculations, and where the cycle end is reached whenever:

Counterstate_cu=Counterstate_sp.

With knowledge of the quantity having entered per trace component and the adsorber capacity, it is possible to prevent overloading or overrunning the adsorber by promptly terminating the adsorption step. Damage to the adsorber or subsequent process steps or system parts can thus be effectively prevented.

In a refinement of the method according to the invention for separating an at least two-component raw gas by means of a TSA process, it is proposed that in the event of falling below the design load value, besides extending the cycle time of at least one method step, a modification should be carried out on the design value of the temperature and/or the design value of the mass flow or flows.

The entire disclosures of all applications, patents and publications, cited herein and of corresponding German application No. DE 102006011031.5, filed Mar. 9, 2006, are incorporated by reference herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for separating a raw gas comprising at least two components by means of a Temperature Swing Adsorption process, said method comprising:

at least one adsorption step and at least one regeneration step, the cycle times of the individual method steps being configured for a design load value of said raw gas, wherein the cycle time of at least one method step is extended in the event of a drop below the design load value.

2. A method according to claim 1, wherein the cycle times of all method steps are extended in the event of a drop below the design load value.

3. A method according to claim 1, wherein the extension of the cycle time of at least one method step is proportionally to the drop below the design load.

4. A method according to claim 1, wherein, in the event of falling below the design load value, besides extending the cycle time of said at least one method step, a modification is carried out on the design value of the temperature of said at least one method step.

5. A method according to claim 1, wherein, in the event of falling below the design load value, besides extending the cycle time of said at least one method step, a modification is carried out on the design value of the mass flows of said at least one method step.

6. A method for separating a raw gas comprising at least two components by means of a Temperature Swing Adsorption process, said method comprising:

at least one adsorption step and at least one regeneration step, the cycle times of the individual method steps being configured for a design load value of said raw gas, wherein the cycle time of at least one method step is extended in the event of a drop below the design load value, and wherein the extended cycle time of said at least one method step is established according to the following formula:

$$Cycletime\_cu = Cycletime\_sp * F\_Load * F\_PT * F\_OP * F\_Age$$

wherein
- Cycletime_cu is the cycle time to be established,
- Cycletime_sp is the cycle time configured for the design load,
- F_Load is the load, where Load is the predetermined raw gas flow rate/current determined raw gas flow rate,
- F_PT is the raw gas conditions,
- F_OP is the specification by the operating staff, and
- F_Age is the ageing status of the adsorbent.

7. A method according to claim 6, wherein
the calculation of the cycle time of said at least one method step is carried out adaptively,
the cycle time of said at least one method step being replaced by a counter state (Counterstate_sp=Cycletime_sp),
and the current counter state being established according to the following formula:

$$\text{Counterstate\_cu} = \sum_{i=0}^{N} \text{F\_Load}_i * \text{F\_PT}_i * \text{F\_OP}_i * \text{F\_Age}_i * \text{F\_Tr}_i * \Delta t_{i-1}$$

wherein
- Counterstate_cu denotes the current counter state to be established,
- Counterstate_sp denotes the counter state configured for the design load,
- F_Load denotes the load (where Load=predetermined raw gas flow rate/current determined raw gas flow rate),
- F_PT denotes the raw gas conditions,
- F_OP denotes the specification by the operating staff and
- F_Age denotes the ageing status of the adsorbent
- F_Tr denotes the content of trace components and
- $\Delta t_{i-1}$ denotes the time difference between the last and current calculations, and where the cycle end is reached whenever: Counterstate_cu=Counterstate_sp.

8. A method according to claim 6, wherein F_PT, F_OP, and F_Age are each 0.5 to 1.5.

9. A method according to claim 7, wherein F_PT, F_OP and F_Age are each 0.5 to 1.5.

10. A method according to claim 6, wherein, in the event of falling below the design load value, besides extending the cycle time of said at least one method step, a modification is carried out on the design value of the temperature of said at least one method step.

11. A method according to claim 6, wherein, in the event of falling below the design load value, besides extending the cycle time of said at least one method step, a modification is carried out on the design value of the mass flows of said at least one method step.

12. A method for separating a raw gas comprising at least two components by means of a Temperature Swing Adsorption process, said method comprising:
at least one adsorption step and at least one regeneration step, the cycle times of the individual method steps being configured for a design load value of said raw gas,
wherein the cycle time of at least one method step is extended in the event of a drop below the design load value, and
wherein at least one of said components is at a concentration of less than 2 vol. % in said raw gas and is removed from the at least two-component raw gas, and the cycle time of said at least one method step is established according to the following formula:

$$\text{Cycletime\_cu} = \text{Cycletime\_sp} * \text{F\_Load} * \text{F\_PT} * \text{F\_OP} * \text{F\_Age} * \text{F\_Tr}$$

wherein
- Cycletime_cu is the cycle time to be established,
- Cycletime_sp is the cycle time configured for the design load,
- F_Load is the load, where Load is the predetermined raw gas flow rate/current determined raw gas flow rate,
- F_PT is the raw gas conditions,
- F_OP is the specification by the operating staff,
- F_Age is the ageing status of the adsorbent, and
- F_Tr is the content of trace components.

13. A method according to claim 12, wherein
the calculation of the cycle time of said at least one method step is carried out adaptively,
the cycle time of said at least one method step being replaced by a counter state (Counterstate_sp=Cycletime_sp),
and the current counter state being established according to the following formula:

$$\text{Counterstate\_cu} = \sum_{i=0}^{N} \text{F\_Load}_i * \text{F\_PT}_i * \text{F\_OP}_i * \text{F\_Age}_i * \text{F\_Tr}_i * \Delta t_{i-1}$$

wherein
- Counterstate_cu denotes the current counter state to be established,
- Counterstate_sp denotes the counter state configured for the design load,
- F_Load denotes the load (where Load=predetermined raw gas flow rate/current determined raw gas flow rate),
- F_PT denotes the raw gas conditions,
- F_OP denotes the specification by the operating staff and
- F_Age denotes the ageing status of the adsorbent
- F_Tr denotes the content of trace components and
- $\Delta t_{i-1}$ denotes the time difference between the last and current calculations, and where the cycle end is reached whenever: Counterstate_cu=Counterstate_sp.

14. A method according to claim 12, wherein F_PT, F_OP and F_Age are each 0.5 to 1.5.

15. A method according to claim 13, wherein F_PT, F_OP and F_Age are each 0.5 to 1.5.

16. A method according to claim 12, wherein, in the event of falling below the design load value, besides extending the cycle time of said at least one method step, a modification is carried out on the design value of the temperature of said at least one method step.

17. A method according to claim 12, wherein, in the event of falling below the design load value, besides extending the cycle time of said at least one method step, a modification is carried out on the design value of the mass flows of said at least one method step.

18. A method according to claim 12, wherein, in the event of falling below the design load value, besides extending the cycle time of said at least one method step, a modification is carried out on the design value of the mass flows of said at least one method step.

19. A method for separating a raw gas comprising at least two components by means of a Temperature Swing Adsorption process, said method comprising:

at least one adsorption step and at least one regeneration step, the cycle times of the individual method steps being configured for a design load value of said raw gas, wherein the cycle time of at least one method step is extended in the event of a drop below the design load value, and wherein the calculation of the cycle time of said at least one method step is carried out adaptively, the cycle time of said at least one method step being replaced by a counter state (Counterstate_sp=Cycletime_sp), and the current counter state being established according to the following formula:

$$\text{Counterstate\_cu} = \sum_{i=0}^{N} F\_Load_i * F\_PT_i * F\_OP_i * F\_Age_i * F\_Tr_i * \Delta t_{i-1}$$

wherein

Counterstate_cu denotes the current counter state to be established,

Counterstate_sp denotes the counter state configured for the design load,

F_Load denotes the load (where Load=predetermined raw gas flow rate/current determined raw gas flow rate), F_PT denotes the raw gas conditions, F_OP denotes the specification by the operating staff and F_Age denotes the ageing status of the adsorbent F_Tr denotes the content of trace components and $\Delta t_{i-1}$ denotes the time difference between the last and current calculations, and where the cycle end is reached whenever: Counterstate_cu=Counterstate_sp.

20. A method according to claim 19, wherein, in the event of falling below the design load value, besides extending the cycle time of said at least one method step, a modification is carried out on the design value of the temperature of said at least one method step.

* * * * *